Aug. 5, 1958     J. L. LUMMUS ET AL     2,846,390
PROCESS FOR RECOVERING LOST CIRCULATION
Filed May 3, 1954
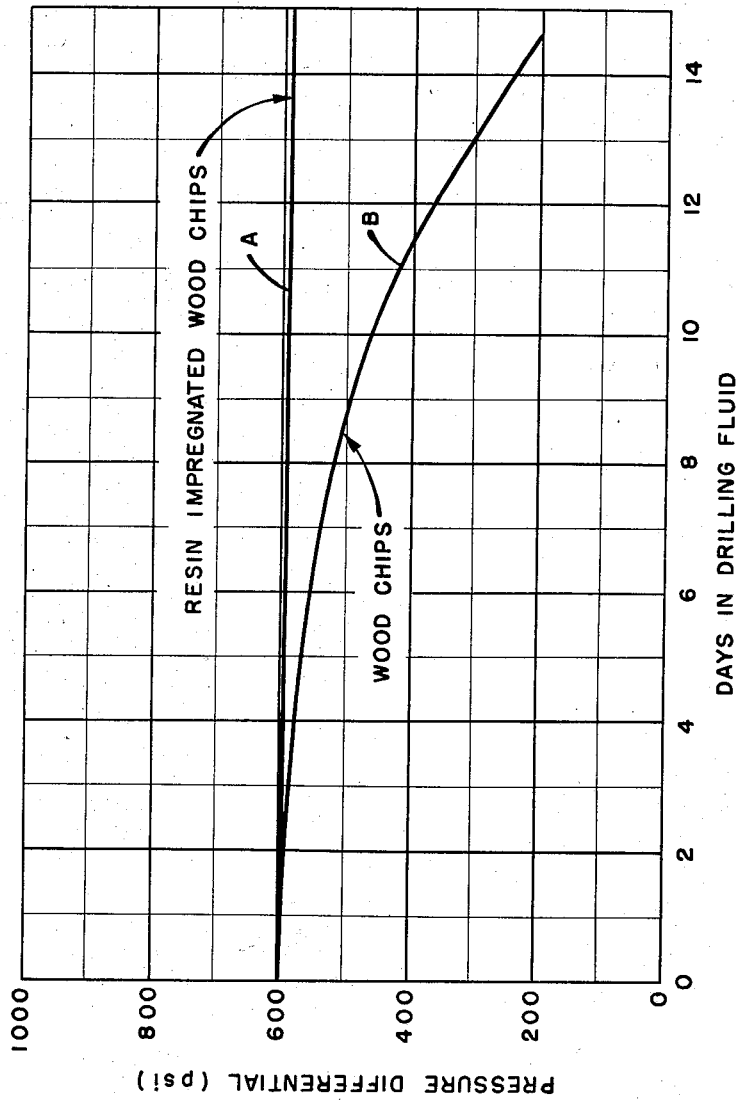
JAMES L. LUMMUS
ROBERT P. MURPHY, JR.
PLATHO P. SCOTT, JR.
       INVENTORS
BY *Goodwin*
       ATTORNEY United States Patent Office 2,846,390
Patented Aug. 5, 1958

2,846,390

PROCESS FOR RECOVERING LOST CIRCULATION

James L. Lummus, Robert P. Murphy, Jr., and Platho P. Scott, Jr., Tulsa, Okla., assignors to Pan American Petroleum Corporation, a corporation of Delaware Application May 3, 1954, Serial No. 427,059

2 Claims. (Cl. 252—8.5)

This invention relates generally to the drilling of wells and, more particularly, to an improved process employing a new bridging material for recovering lost circulation in drilling wells and the like and to a method for manufacturing the bridging material.

In the drilling of wells by the rotary process, a drilling fluid is pumped through the drill pipe down to the bottom of the well and thence to the surface through the annular space. This drilling fluid is often substantially heavier than water so that it produces a high hydrostatic fluid head on the bottom of the well and in some cases causes weak formations to part or fracture and the drilling fluid to be lost through the fracture into the surrounding formations. Induced fractures which cause loss of circulation may be caused by various other means, such as lowering the drill pipe too rapidly. Occasionally also, a formation is penetrated which has natural fractures, vugs, or other highly permeable flow channels that take whole drilling fluid and cause loss of returns. The colloidal particles normally used in drilling fluids are too small to seal these natural and induced fractures and other highly permeable flow channels in formations. Accordingly, when such formations are drilled, the whole drilling fluid often tends to flow into and be lost in the formation if the hydrostatic head produced by the drilling fluid is greater than the pressure of the fluids in the formation. Various means have been proposed for sealing these large flow channels which take whole mud. The most common method of recovering circulation which has been lost due to penetration of these formations is to incorporate in the drilling fluid some of the so-called bridging materials, i. e., large solid particles which are substantially larger than the colloidal particles, typically solids having at least one dimension several times larger than the colloidal particles. These large particles of bridging material or lost circulation recovery materials, as they are sometimes called, are divided into three general classes, namely flaky materials such as cellophane flake, fibrous materials such as cotton linters, and granular materials such as ground strong nutshells. The granular materials due generally to their greater strength, have been found in many cases to be highly superior to the other classes of bridging materials. Many of the granular materials, particularly the lightweight granular materials, have been found to be softened by contact with the drilling fluid or otherwise to be at least partially decomposed in the drilling fluid so that the strength of the particles is insufficient after being in the drilling fluid for a few days to keep the fractures and flow channels within the formation from taking the whole mud. That is, many of the bridging materials soften in the drilling fluid and become too weak to produce a bridge in the flow channel on which the finer particles such as the colloids in the drilling fluid can seal and prevent the loss of the drilling fluid. Furthermore, most of the granular bridging materials are substantially more dense than the drilling fluid itself so that these materials tend to settle out in the settling pits, the well, etc., when the drilling fluid becomes quiescent.

It is an object of this invention to provide an improved bridging material and a method of manufacturing same. It is a more particular object of this invention to provide an improved process employing a lightweight strong bridging material which will not deteriorate upon remaining suspended in a drilling fluid over long periods of time. It is a still more specific object of this invention to provide an improved method of manufacturing a lightweight strong bridging material which is not adversely affected by standing in contact with the drilling fluid over an extended period of time. These and other objects of this invention will become apparent from the following description of the invention. In this description reference will be made to the accompanying drawing which is a plot of effective strengths of different bridging materials versus the time of immersion in a drilling fluid.

The invention in brief comprises an improved lightweight strong granular bridging material for use in either aqueous or nonaqueous drilling fluids consisting of finely-divided particles of wood impregnated with a resin which is insoluble in the drilling fluid. The invention also includes a method of manufacturing this bridging material, the method of manufacture comprising first the impregnation of wood chips with a resinous material and the subsequent grinding of these impregnated wood chips into finely-divided particles in the size range normally employed for bridging materials.

As indicated above, our bridging material is primarily granulated wood particles which are rendered inert to swelling or deterioration in the presence of the drilling fluid, either aqueous or nonaqueous or in combination as in an emulsion. In the typical case, i. e., the water-base drilling fluid, the wood granules, which would otherwise swell and be softened by the aqueous liquid in the drilling fluid, are waterproofed by impregnation with a water-insoluble resin. To impregnate the wood with this resin, the wood is preferably first reduced to chips having a minimum dimension in the range $\frac{1}{16}$–1 inch and a maximum dimension typically in the range of 3 or 4 inches or thereabout. As can be seen from the following description, the maximum dimension may vary from $\frac{1}{16}$ inch to 1 foot or more depending only upon the method of making the chips and the convenience of handling them. The chips are typically by-products of other industries such as sawmills, wood shredders, planing mills, and the like. Almost any type of wood may be employed as the base particle in our bridging material. We prefer dried soft woods which generally are less dense and more highly permeable than the hard woods. The soft woods such as cedar, Douglas fir, hemlock, redwood, and particularly the conifers such as pine, spruce, cypress, and fir are preferred. A southern or yellow pine has been found to be highly satisfactory due to its light weight, high permeability, and great strength. Some of the so-called hard woods such as poplar, sycamore, elm, and gum, i. e., the hard woods having low density and high permeability, are in some cases substantially equivalent to the soft woods. Generally, the sapwood rather than the heartwood of any particular log is preferred due to its higher permeability and lower density. The bark, while less dense than the sapwood, is, however, generally not considered satisfactory due to its low shear and compressive strength.

Wood chips in the preferred size range indicated above are loaded into a pressure chamber where they are impregnated with the resin. This resin is preferably amorphous and does not contain solids, particularly colloidal solids, which would plug the pores in the wood. Resin is used herein in the broad sense to include high molecular weight materials somewhat like rosin in appearance and properties. That is, resin includes solids having a melting point substantially above the temperature at the bottom of a well, typically a melting point greater than about 100° F. While most resins are thermoplastic and melt when the temperature is raised, we are not limited to such thermoplastic resins. Any of these resins which are amorphous, solid free in the liquid or unpolymerized state, and generally insoluble in the drilling fluid, either water or oil base, are satisfactory. They may include both natural and synthetic resins including plastics. They may be oxidation or polymerization products of the natural hydrocarbons such as the terpenes, or of the coal tar industry, or of the petroleum industry. Rosin, the alkyd resins, phenol-aldehyde resins, polyalcoholphthalic anhydride esters, urea formaldehyde resins, vinyl polymers, acrylate polymers, and the like, particularly the synthetic or artificial plastics are examples. The synthetic hydrocarbon resins being less tacky and less subject to cold flow are generally preferred. Of the synthetic hydrocarbon resins, we prefer the drip oil resins, i. e., those resins which are typically made from still bottoms and the like. One such class of materials that has been found to possess the most desirable properties is available on the market as the Panarez resins, particularly Panarez 6–210 and 12–235, manufactured by Pan American Refining Corporation. These resins are made by the polymerization of a gasoline boiling range unsaturated hydrocarbon mixture produced as a byproduct of a gas-cracking process. They are described in U. S. Patent 1,982,708 Thomas et al. and the patents therein cited, and particularly in U. S. Patent 2,067,073. The starting material is composed mainly of light aromatics, olefins, and diolefins as illustrated by the following approximations:

|  | Volume percent [1] |
|---|---|
| Aromatics | 56 |
| Olefins and diolefins (approx. 50:50) | 41 |
| Paraffins and naphthenes | 3 |
|  | 100 |

[1] Benzene ..... 39
Toluene ..... 10
Xylenes ..... 2.5
$C_9$–$C_{10}$ ..... 4.5
     56.0

In addition to these natural and synthetic resins, we intend to include as a resin those high molecular weight solids which have properties, as indicated above, similar to rosin. The high melting point waxes such as microcrystalline hydrocarbon wax derived from petroleum, ceresin wax, and high melting synthetic wax-like materials such as the anilides and amides of higher fatty acids are examples. In the case of the water-insoluble resins for use in aqueous drilling fluids, silicone which is in the same class of materials has been found to produce impregnated wood chips which are highly resistant to deterioration and softening. It can thus be seen that any water or oil incompatible solid which can first be squeezed into wood chips in a liquid or vapor state and subsequently by cooling, heating oxidation, polymerization, or the like can be hardened to produce a filler for the wood pores and prevent the liquid in the drilling fluid from contacting the fibers of the wood can be used to impregnate the wood chips.

The wood chips are placed in a pressure vessel or container and the pressure vessel is filled with the resin or its constituents in a fluid, preferably a liquid, state so that the wood chips are completely submerged in the liquid. The liquid thermoplastic resins in addition to or in lieu of heating are sometimes diluted to reduce their viscosities by dissolving them in up to equal volumes of a volatile solvent which is later evaporated when the resin is hardened. Pressure is then applied to the liquid in the container to cause the liquid to penetrate the wood. Depending upon the time of application, the viscosity of the resinous liquid, the permeability of the wood, the minimum dimension or the thickness of the chips, and the like, a pressure of between about 100 and about 10,000 pounds per square inch is applied to the liquid. Typically, a pressure of between about 200 and about 500 pounds per square inch applied over a period of 10–30 minutes has been found sufficient to cause the resinous liquid to penetrate reasonably thin wood chips. Pilot tests with the particular resins and woods are often desirable to determine the most efficient operating conditions. With thermoplastic resins, it can be seen that if the chips are not properly impregnated under low pressure or temperature, the chips can be run again under more severe conditions. In some cases, after the wood chips have been loaded into the chamber, it is desirable to apply a high vacuum to the chamber and the wood chips to remove air out of the permeable and porous wood so that the resin can subsequently be forced into these pores more readily. It is also sometimes considered desirable after the wood pores have been filled with the resin to apply a vacuum to the wood chips to withdraw surplus resin. Since the preferred resins typically preferentially wet the wood fibers, the wood fibers are left coated with the resin and the surplus resin is thus withdrawn from the chips by the vacuum whereby the density of the chips and the cost of treatment are both reduced. In any case, after the wood chips have been submerged in the resin and pressure has been applied to cause the resin to penetrate the pores of the wood, the surplus resin is withdrawn from the pressure chamber and the resin is hardened in the pores of the wood. This resin may be hardened while the chips are still in the pressure chamber or the chips may be removed therefrom for this treatment. Depending upon the material, the hardening of the resin may be accomplished by heating, cooling, oxidation, polymerization, or the like. For example, the chips may be taken out and dried or hardened by cooling and/or oxidation in the atmosphere, but it is generally desirable, particularly in the case of the synthetic hydrocarbon resins, to harden the resins in place by circulating heated air through the pressure chamber. The chips, of course, touch other chips so that when the resin is hardened, there is a slight tendency for the mass of chips in the pressure chamber to become agglomerated or bound together. Since the points of contact are generally small, we have found that these wood chips can be displaced out of the pressure chamber with litle difficulty as, for example, by use of a hydraulic ram. In the case of the thermosetting resins, the chips may be passed through a rotary kiln and the resin will be hardened in the pores of the wood chips without agglomeration of the particles so that the chips leave the kiln as separate particles or chips.

After the resin is hardened in the wood chips, if the chips are not otherwise disconnected or dispersed, the agglomerated chips are broken up into pieces small enough to be placed in a grinder. They may be ground in any type of mill, but we have found that an impact-type of mill such as a hammer mill or a cage mill is prefererd. The chips are ground in the mill to the proper size range and particle size distribution. The maximum particle size is limited generally only by the capacity of a mud pump to pump the particles. In some cases, granules as large as ½ inch in maximum dimension may be pumped, but generally the particles are limited to a maximum size of about −4 mesh. The term "mesh" used herein and in the claims refers to a standard U. S. sieve analysis. The smaller particles are typically substantially larger than colloidal size. For example, the smaller particles should be in the range of about +60 to about +200 mesh, typically +100 mesh. Desirably, particles of all intermediate sizes between about −4 and about +100 mesh are included, and generally we have found it highly desirable to make about ⅓ of the granules in the particle size range −4 to +10 mesh and about ⅔ of the granules in the particle size range −10 to +100 mesh. A minus sign as applied to a particle size herein refers to particles passing through the sieve and a plus sign refers to the particles being retained on the sieve.

The basic or foundation material in these bridging material particles is desirably strong. In fact, the wood itself is much stronger and more resistant to breaking than the resin itself. If the wood has not been softened or deteriorated by contact with water, it is generally strong enough to withstand a high displacement pressure when it is bridged in a flow channel in the formation. The resin maintains the wood in its initial state so that it remains strong. This effect is shown in the drawing which is a plot of the strength of plain wood chips and resin-impregnated wood chips of the same size and type versus time in days of submersion of the bridging material in an aqueous drilling fluid. Strength is plotted as the pressure differential across a narrow slit which a bridge of the granules withstands before failure. In these tests, the plain bridging materials were made by grinding southern pine wood chips in a hammer mill having a ¼-inch diameter screen. The grindings from this mill were then screened into two grades, −4 +10 mesh and −10 +100 mesh, and these two grades were then mixed in equal proportions. The mixed granules were then added at the rate of 10 pounds per barrel to a 4 percent bentonite, 2 percent El Paso clay aqueous drilling fluid having a filtrate rate of 15 cc. per 30 minutes in the standard API filtrate rate test. The resin-impregnated bridging material was made by first impregnating some of the same type wood chips with a drip oil resin, as above described. Specifically, the chips were impregnated with Panarez 7–210, a resin having a softening point of 210° F., and then the impregnated chips were ground in a hammer mill in the same manner as the plain wood chips. Subsequently, the grindings were screened and mixed so that the particle sizes, the ratio of particle sizes, and the concentration in the drilling fluid were the same as with the plain wood bridging material described above. As soon as the bridging materials were dispersed in the drilling fluid, the drilling fluid was pumped through an 0.18 x 1 inch rectangular slit in a metallic disk. The drilling fluid containing the bridging material was circulated through this slit until a bridge had developed and the slit was plugged. The upstream pressure on the bridge was then increased until the bridge failed and circulation was tentatively restored. The pressure differential across the slit required to break down the bridge was then recorded. This test was repeated at intervals throughout a period of fifteen days, and the pressure differential required to break down the bridge was plotted versus the number of days the bridging material had been in the drilling fluids. Curve A in the drawing shows the results obtained from the resin-impregnated wood bridging materials. Curve B shows the results obtained from the plain wood bridging materials. As indicated by curve B, the strength of the plain wood bridging material decreased appreciably as the particles became softened by contact with the aqueous drilling fluid. In fact, after about two weeks the strength of the bridge produced by these particles was only about ⅓ of the initial strength. By comparison, the bridging material made from resin-impregnated wood chips remained substantially constant throughout the test period, as indicated by curve A. This ability to maintain strength over extended periods is obviously desirable, particularly in lightweight bridging materials which can be kept in the circulating system without settling out throughout the drilling of the lost circulation zones or even in some cases throughout the drilling of the complete well.

Resin-impregnated wood bridging materials are light in weight since the resins are typically in the same density range as the drilling fluid. The wood which is initially lighter or less dense is thus not rendered so dense by impregnation with the resin that the granules are hard to suspend in the drilling fluid. The granules typically have a specific gravity in the range 0.9 to 1.2 depending upon the wood and the resin used. For comparison, the specific gravity of ground walnut shells is about 1.4. The concentration of the granules in the drilling fluid is not considered critical. Generally, the higher the concentration, the more rapid the bridge forms. Typically, the concentration is in the range of between about 1 and about 10 pounds of granules per barrel of drilling fluid.

As an example of the effect of impregnating 3/16 inch thick yellow pine chips with synthetic hydrocarbon drip oil resins at a pressure of 500 p. s. i. as above described, the chips were ground to a particle size throughout the range −4 to +100 mesh and the particles were dispersed in a 10-pound per gallon water-base drilling fluid containing 5 percent bentonite. The bridging material was allowed to remain in the drilling fluid for several days without settling and then it was forced through a slit to determine whether the slit could be sealed. In one test, 1 pound of the resin-impregnated wood was dispersed in a barrel of this drilling fluid and the drilling fluid was pumped through a slit having a length of about 1 inch and a width of 0.108 inch. By the time 1 gallon of the drilling fluid containing the bridging material had been pumped through the slit, it was sealed and withstood a differential pressure of 1,850 p. s. i. across the slit. A similar slit having a width of 0.124 inch was then tested using 12 pounds per barrel of the resin-impregnated wood bridging material. After 18 gallons of this drilling fluid had been pumped through the slit, the differential pressure built up to greater than 600 p. s. i., indicating that the slit was sealed. It can thus be seen that when wood chips are, as in the preferred embodiment, impregnated with a waterproofing agent such as synthetic resin and ground into a size suitable for bridging fractures, highly permeable flow channels, and the like in the formation, the granules do not settle out of a typical drilling fluid, the wood is not deteriorated by contact with the drilling fluid, and the wood remains strong enough to produce a bridge in the relatively large crevices.

From the foregoing, it can be seen that our invention is susceptible of a wide variety of modifications and that the invention should not be construed to be limited by the description which has been given by way of example of the composition and the method of manufacture thereof, but it should be construed to be limited only by the scope of the appended claims.

We claim:

1. In a process for drilling a well wherein an aqueous drilling fluid is circulated in said well, the method of recovering lost circulation which comprises admixing with said drilling fluid ground wooden particles, said particles having sizes throughout the range −4 to +100 mesh and being waterproofed by resin impregnation prior to grinding.

2. In a process for drilling a well wherein an aqueous drilling fluid is circulated in said well, the method of recovering lost circulation which comprises admixing with said drilling fluid waterproofed wooden granules in particle sizes throughout the range −4 to +100 mesh, said granules being formed by submerging wood chips having a minimum dimension in the range 1/16–1/12 inch in a water-insoluble liquid resin, applying sufficient hydraulic pressure to said liquid resin for a sufficient time to impregnate said wood chips with said liquid resin, applying a vacuum to said wood chips to remove excess liquid resin therefrom, hardening the residue of said resin in said wood chips, and thereafter grinding the resin-impregnated chips to produce said granules.

(References on following page)

References Cited in the file of this patent

UNITED STATES PATENTS

| | | | |
|---|---|---|---|
| 249,856 | Percy | Nov. 22, | 1881 |
| 1,697,248 | Lauter | Jan. 1, | 1929 |
| 1,729,056 | Texier | Sept. 24, | 1929 |
| 1,807,082 | Boynton | May 26, | 1931 |
| 1,834,895 | Brossman | Dec. 1, | 1931 |
| 1,899,768 | Nevin | Feb. 28, | 1933 |
| 1,959,375 | Loetscher | May 22, | 1934 |
| 2,398,649 | Kvalnes | Apr. 16, | 1946 |
| 2,477,219 | Van Dyke | July 26, | 1949 |
| 2,549,563 | Barnstead | Apr. 17, | 1951 |
| 2,650,195 | Cardwell et al. | Aug. 25, | 1953 |

OTHER REFERENCES

Sawdon: Lost Circulation in Rotary Holes, article in the Petroleum Engineer, February 1936, pages 27 to 30.

Rogers: Composition and Properties of Oil Well Drilling Fluids, 2nd edition, pub. 1953 by Gulf Pub. Co. of Houston, Texas, page 562.

Haseke: APC publication of Serial No. 203,679, pub. May 11, 1943.